(12) United States Patent
Deiss et al.

(10) Patent No.: US 11,229,980 B2
(45) Date of Patent: Jan. 25, 2022

(54) MACHINES FOR THE SEPARATIVE MACHINING OF PLATE-SHAPED WORKPIECES

(71) Applicant: TRUMPF Werkzeugmaschinen GmbH + Co. KG, Ditzingen (DE)

(72) Inventors: Magnus Deiss, Stuttgart (DE); Peter Epperlein, Leonberg (DE); Simon Ockenfuss, Boeblingen (DE); Frank Schmauder, Metzingen (DE); Dennis Wolf, Leonberg (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 294 days.

(21) Appl. No.: 15/186,797

(22) Filed: Jun. 20, 2016

(65) Prior Publication Data

US 2016/0311069 A1 Oct. 27, 2016

Related U.S. Application Data

(63) Continuation of application No. PCT/EP2014/077531, filed on Dec. 12, 2014.

(30) Foreign Application Priority Data

Dec. 20, 2013 (DE) .......................... 102013226816

(51) Int. Cl.
*B23K 37/04* (2006.01)
*B23K 10/00* (2006.01)
(Continued)

(52) U.S. Cl.
CPC .......... *B23K 37/0408* (2013.01); *B23K 10/00* (2013.01); *B23K 26/083* (2013.01);
(Continued)

(58) Field of Classification Search
CPC ........ B23K 37/04; B23K 10/00; B23K 26/08; B23K 26/14; B23K 26/38; B23K 37/02;
(Continued)

(56) References Cited

U.S. PATENT DOCUMENTS 2,322,380 A * 6/1943 Mosley, Jr. ............. B25B 1/103
269/152
3,054,333 A * 9/1962 Sedgwick ............ B23Q 7/1426
29/26 R
(Continued)

FOREIGN PATENT DOCUMENTS

CN 1743131 A 3/2006
CN 1929936 3/2007
(Continued)

OTHER PUBLICATIONS

Machine translation of JP 61-206586 performed on Jan. 26, 2021.*
(Continued)

*Primary Examiner* — Samuel M Heinrich
(74) *Attorney, Agent, or Firm* — Fish & Richardson P.C.

(57) ABSTRACT

The invention relates to machines and methods for separative machining of plate-shaped workpieces by a processing beam. The machines include a first movement unit configured to move the workpiece in a first direction and a second movement unit including a machining head configured to emit the processing beam. The second movement unit is configured to move the machining head in a second direction perpendicular to the first direction to direct the processing beam onto the workpiece. The machines include a first workpiece support unit including a first workpiece-bearing face and a second workpiece support unit including a second workpiece-bearing face spaced apart by a gap from the first workpiece support unit and the first workpiece-bearing face. The gap extends along the second direction. The machines include at least one support slide arranged to move in the
(Continued)

second direction within the gap and including a support slide bearing face.

13 Claims, 3 Drawing Sheets

(51) Int. Cl.
| | |
|---|---|
| B23K 26/08 | (2014.01) |
| B23K 26/14 | (2014.01) |
| B23K 26/38 | (2014.01) |
| B23K 37/02 | (2006.01) |
| B26F 3/00 | (2006.01) |
| B26D 7/20 | (2006.01) |
| B23K 26/146 | (2014.01) |
| B23K 26/142 | (2014.01) |
| B26F 1/38 | (2006.01) |

(52) U.S. Cl.
CPC ...... *B23K 26/0869* (2013.01); *B23K 26/0876* (2013.01); *B23K 26/142* (2015.10); *B23K 26/146* (2015.10); *B23K 26/38* (2013.01); *B23K 37/0235* (2013.01); *B26D 7/20* (2013.01); *B26F 3/004* (2013.01); *B26F 1/3813* (2013.01)

(58) Field of Classification Search
CPC ............... B23K 26/20; B23K 37/0408; B23K 37/0235; B23K 37/0211; B23K 37/0241; B23K 26/142; B23K 26/145; B23K 26/083; B23K 26/0838; B23K 26/0846; B23K 26/0853; B23K 26/0861; B23K 26/0869; B23K 26/0876; B23K 37/0288; B26F 3/00; B26F 1/3813; B26F 1/38; B26F 1/3806; B26F 1/386; B26D 7/20
USPC ............... 219/121.67–121.73, 121.6, 121.85
See application file for complete search history.

(56) References Cited

U.S. PATENT DOCUMENTS

| | | | | |
|---|---|---|---|---|
| 3,422,246 A * | 1/1969 | Wetzel | ............... | B23K 26/0626 |
| | | | | 219/121.61 |
| 4,116,097 A | 9/1978 | Graham et al. | | |
| 4,159,821 A * | 7/1979 | Hickman | ............. | B23D 59/007 |
| | | | | 269/139 |
| 4,752,665 A | 6/1988 | del Santo | | |
| 4,916,992 A | 4/1990 | Nasu | | |
| 4,993,296 A | 2/1991 | Nasu | | |
| 6,727,457 B1 | 4/2004 | Vande Berg | | |
| 7,659,490 B2 | 2/2010 | Beilke | | |
| 8,256,752 B2 | 9/2012 | Kilian et al. | | |
| 8,294,061 B2 | 10/2012 | Schmauder | | |
| 9,757,816 B2 * | 9/2017 | Fujita | ..................... | B23K 26/14 |
| 2003/0066574 A1 | 4/2003 | Lovchik et al. | | |
| 2006/0118529 A1 | 6/2006 | Aoki et al. | | |
| 2007/0221637 A1 | 9/2007 | Schurmann et al. | | |
| 2008/0168876 A1 | 7/2008 | Kilian et al. | | |
| 2009/0010731 A1 * | 1/2009 | Heusel | ................. | B21D 45/003 |
| | | | | 409/199 |
| 2009/0315238 A1 * | 12/2009 | Schroeder | ................. | B25B 1/02 |
| | | | | 269/142 |
| 2010/0181165 A1 * | 7/2010 | Finn | ....................... | B23K 26/38 |
| | | | | 198/339.1 |
| 2010/0252542 A1 | 10/2010 | Zeygerman | | |
| 2011/0132159 A1 * | 6/2011 | Goodman, Jr. | ........ | B23K 10/00 |
| | | | | 83/13 |
| 2013/0277343 A1 | 10/2013 | Finn | | |
| 2014/0090443 A1 | 4/2014 | Schmauder et al. | | |
| 2014/0216223 A1 * | 8/2014 | Epperlein | .............. | B23K 26/38 |
| | | | | 83/23 |

FOREIGN PATENT DOCUMENTS

| | | | | |
|---|---|---|---|---|
| CN | 101332568 | 12/2008 | | |
| CN | 101415648 | 4/2009 | | |
| CN | 201346719 | 11/2009 | | |
| CN | 101873909 A | 10/2010 | | |
| CN | 102099153 A | 6/2011 | | |
| CN | 102281986 | 12/2011 | | |
| CN | 202336634 U | 7/2012 | | |
| DE | 3509418 A1 | 9/1986 | | |
| DE | 3620896 A1 | 1/1987 | | |
| DE | 3917253 C2 | 1/1994 | | |
| DE | 102004059766 | 6/2006 | | |
| DE | 102011051170 A1 | 12/2012 | | |
| DE | 102011054360 A1 | 4/2013 | | |
| DE | 102011054361 A1 | 4/2013 | | |
| EP | 927597 A1 | 7/1999 | | |
| EP | 2 008 752 | 12/2008 | | |
| EP | 1901893 B1 | 3/2011 | | |
| EP | 2527058 A1 | 11/2012 | | |
| JP | 61206586 A * | 9/1986 | ......... | B23K 26/0838 |
| JP | 61206586 A | 9/1986 | | |
| JP | 63278694 A1 | 11/1988 | | |
| JP | 2030332 A | 1/1990 | | |
| JP | 02274494 A | 11/1990 | | |
| JP | H 03254381 | 11/1991 | | |
| JP | 5050346 A1 | 3/1993 | | |
| JP | 6170469 A1 | 6/1994 | | |
| JP | H06170469 | 6/1994 | | |
| JP | 07290267 A | 11/1995 | | |
| JP | 10118879 A | 5/1998 | | |
| JP | H 10-166175 | 6/1998 | | |
| JP | H 10 296478 | 11/1998 | | |
| JP | 2000246564 A1 | 9/2000 | | |
| JP | 2001/170727 | 6/2001 | | |
| JP | 2003245838 A1 | 9/2003 | | |
| JP | 2004050184 A * | 2/2004 | ......... | B23K 26/0846 |
| JP | 2004050184 A1 | 2/2004 | | |
| JP | 2007160811 | 6/2007 | | |
| JP | 2008264996 | 11/2008 | | |
| JP | 2012515657 | 7/2012 | | |
| JP | 2013119101 A1 | 6/2013 | | |
| WO | WO 2008/138370 | 11/2008 | | |
| WO | WO 2010/085486 | 7/2010 | | |
| WO | WO2013053569 A1 | 4/2013 | | |

OTHER PUBLICATIONS

Office Action in Japanese Application No. 2017-548287, dated Jul. 12, 2018, 6 pages (with English translation).

Office Action in Chinese Application No. 201480069791.1, dated Sep. 21, 2017, 18 pages (with English translation).

Korean Office Action in Application No. 10-2018-7034348, dated Apr. 4, 2019, 16 pages (with English translation).

\* cited by examiner

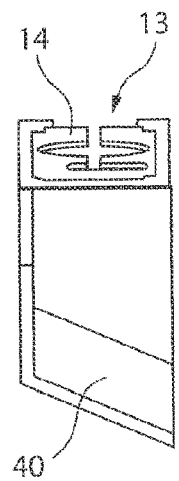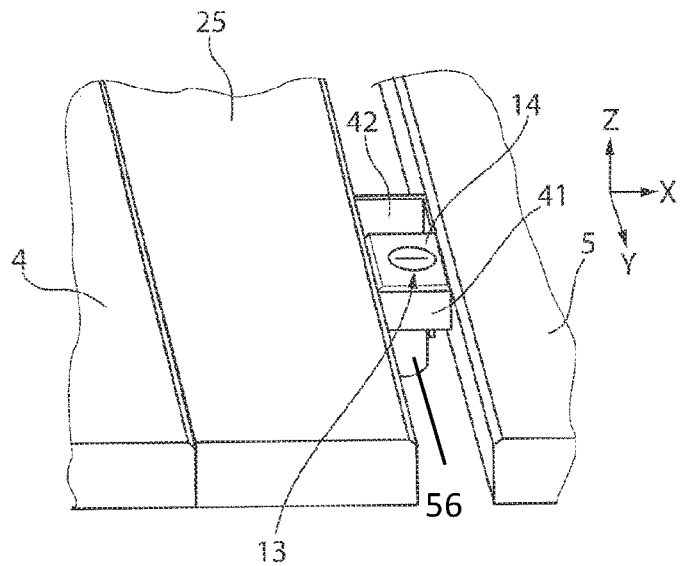
Fig. 6    Fig. 7
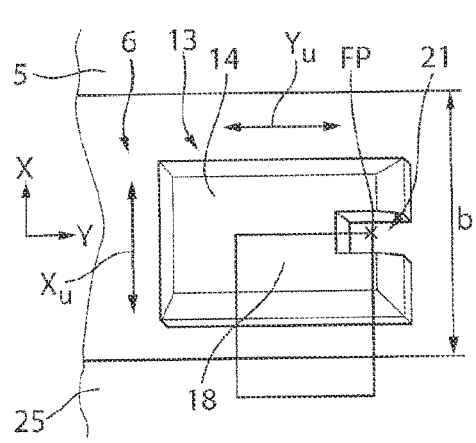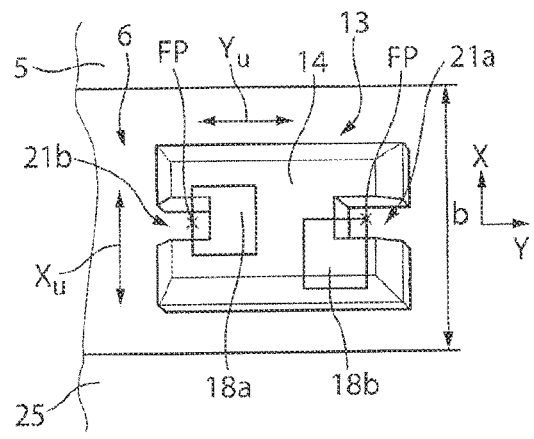
Fig. 8A    Fig. 8B

MACHINES FOR THE SEPARATIVE MACHINING OF PLATE-SHAPED WORKPIECES

CROSS-REFERENCE TO RELATED APPLICATIONS

This application is a continuation of and claims priority under 35 U.S.C. § 120 to PCT Application No. PCT/EP2014/077531 filed on Dec. 12, 2014, which claims priority to German Application No. DE 10 2013 226 816.5, filed on Dec. 20, 2013. The entire contents of these priority applications are incorporated herein by reference.

TECHNICAL FIELD

The present disclosure relates to machines that cut workpieces using processing beams such as lasers.

BACKGROUND

Japanese patent publication JP 5050346A discloses a machine for the separative machining of plate-shaped workpieces by means of a laser beam, in the form of a combined laser and punch machine. The machine disclosed by JP 5050346A implements hybrid motion control in which the workpiece is moved in a first direction (direction X), and the machining head is moved in a second direction (direction Y). The workpiece bearing is discontinuous in the displacement range of the machining head to prevent the workpiece bearing from being in a line of sight of the processing beam to avoid damaging the workpiece bearing by the processing beam. In particular, the workpiece bearing may be split and/or include a gap that extends in the Y direction between two workpiece-bearing faces or workpiece bearings. The processing beam that has passed through the workpiece and any slag and cutting waste that may arise are expelled therethrough. The processing beam may be a laser beam, but the use of a water jet or of another type of high power beam, for example in the form of a plasma arc, is also possible.

Particularly in the case of such a laser processing machine having an additional axis for moving the machining head in the direction X, it is advantageous for the gap in the workpiece bearing to have a minimum width that corresponds to at least the displacement range of the machining head in the direction X. The additional axis permits the machining head to be displaced with a high level of dynamics within the gap. On the other hand, a wide gap allows small to medium-size cutting waste, residual mesh parts, or comparatively small workpiece parts, which may be separated from one another and from the slag for example with the aid of parts chutes, to fall freely. Small parts may be removed from the cutting region in a significantly more rapid manner than by way of the pivoting movement of a discharge flap provided for this purpose.

However, a large gap width may also have a negative effect when performing the separating cuts of comparatively small workpiece parts, since small workpiece parts are not adequately supported in the gap region and by virtue of the high gas pressure of the cutting gas or water, respectively, that exits from the processing nozzle on the machining head and impacts the cut off workpiece parts, the small workpiece parts can potentially tilt in the gap and in some instances potentially catch on the residual workpiece.

Japanese patent publication JP2000246564 A2 discloses a laser and punch machine in which the workpiece is moved in the direction X and a punching die and blanking die are conjointly moved in the direction Y. For this purpose, the punching die and the blanking die by way of lever arms and universal joints are intercoupled and coupled to a common drive.

Japanese patent publication JP2030332 A1 describes a machine for thermal cutting and punching of workpieces, wherein a laser cutting-head is displaced in direction X and direction Y by means of two driven slides. The machine has a workpiece receptacle that is displaceable in direction Y synchronously to the laser cutting-head.

German publication DE 39 17 253 C2, discloses a device for cutting layered strip material that has a frame and a retaining belt that is moveable to and fro in the longitudinal direction of the frame. In certain examples, the device has a cutting head that in a running component, which is moveable to and fro in the longitudinal direction of the frame, is retained such that said cutting head is moveable to and fro in the transverse direction. The device has a lower receptacle component that is fastened to the running component and has a groove-shaped cross section. A plurality of interconnected locking plates that in the transverse direction are moveable to and fro so as to be synchronous with the cutting head are received in the receptacle component. A cutting-receptacle sleeve that supports a tip of the cutting unit may be fitted between the locking plates. Instead of the cutting head, a nozzle head for ejecting an ultra-high pressure liquid may be provided on the running component. In this case, a liquid receptacle sleeve is fitted between the locking plates.

SUMMARY

The present disclosure relates to machines for the separative machining, e.g., cutting and stamping, of plate-shaped workpieces, in particular laser processing machines that during the separative machining enable support of workpiece parts and are adapted to the workpiece size, workpiece contour, and/or workpiece thickness, and in particular enable simplified discharging of cut off workpiece parts.

In certain embodiments, this is achieved by machines as described herein. The machines include a first movement unit configured to move the plate-shaped workpiece in a first direction (X). The machines include a second movement unit for moving a machining head configured to emit the processing beam. The second movement unit is configured to move the machining head in a second direction (Y) perpendicular to the first direction (X) to direct the processing beam onto the workpiece. The machines include a first workpiece support unit including a first workpiece-bearing face for supporting the workpiece. The machines include a second workpiece support unit including a second workpiece-bearing face for supporting the workpiece. The first workpiece support unit and the first workpiece bearing face are spaced apart by a gap from the second workpiece support unit and the second workpiece-bearing face. The gap extends along the second direction (Y). The machines include at least one support slide arranged to move freely in the second direction (Y) within the gap. The at least one support slide includes a support slide bearing face for supporting workpiece parts that are cut in the course of the separative machining.

In some implementations, at least one support slide is located in the displacement range of the processing beam. The displacement of the support slide in the direction Y within the gap can be controlled in a manner synchronous with the machining head or else in a manner independent of the machining head. The support slide during machining and in particular during separative cutting can support the workpiece or cut workpiece parts, respectively. As opposed to the stationary workpiece-bearing faces, this displaceable support slide has significantly smaller dimensions and can therefore be dynamically moved in the gap between the workpiece-bearing faces. The machine uses various drives that enable the support slide and the machining head to be displaced to various positions in the direction Y in a mutually independent manner so that the support slide and the machining head can be independently moved in the gap.

A workpiece-bearing face in the context of this application is understood to be a workpiece bearing that is suitable for supporting the plate-shaped workpiece in a planar manner. Such a workpiece-bearing face need not form a continuous surface; rather, it suffices for the workpiece to be supported at a plurality of points (at least three, typically significantly more) by bearing elements (optionally only in a punctiform manner), so as to mount the workpiece in one bearing plane, i.e., the workpiece-bearing face in this case is formed by the upper sides of the bearing elements. The workpiece-bearing faces between which the gap is formed may be configured in the form of a brush table or a ball table, for example. The workpiece to be machined during machining is in this case supported by many bearing elements in the form of brushes or (rotatable) balls that are disposed on or in a table surface, respectively, and that collectively form the workpiece-bearing face. Alternatively, rotatable rollers that are disposed so as to be parallel with the gap and the rotation axis of which extends parallel with the gap may be provided as bearing elements for forming workpiece-bearing faces. Moreover, it is possible for the workpiece-bearing faces to be designed as revolving bearing belts.

Accordingly, the support slide that faces the workpiece may also have a continuous bearing face that may be brought to bear on the underside of the workpiece. Alternatively, the support slide may have a plurality of bearing elements, for example in the form of bearing pins, balls, or brushes that collectively form the bearing face on which the workpiece or cut off workpiece parts may be borne.

During machining on the machine according to various embodiments of the invention, large workpiece parts, given adequate flexural rigidity or adequate thickness of the workpiece material, respectively, may be cut without additional support in the gap. In this case, the support slide during machining is positioned so as to be spaced apart from the machining head such that the support slide does not influence machining. By disposing the support slide so as to be adequately spaced apart from the machining head, contamination of or damage to the support slide by the processing beam may be avoided. By contrast, the support slide during machining or at least for the separating cut is positioned below the workpiece part when cutting comparatively small workpiece parts that are prone to tilting and that after being cut off are not borne on both workpiece-bearing faces and/or do not have adequate flexural rigidity. Positioning the support slide below the workpiece part in this manner provides support for the workpiece part in a planar manner or in a punctiform manner at a plurality of points, thereby counteracting tilting of the workpiece part.

In certain embodiments of the machine according to the invention, a support slide that is additionally displaceable in a controlled manner in the first direction (in the direction X) is disposed in the gap. The machine can include a drive unit configured to displace the support slide in the controlled manner. In such cases, not only is the dimension of the support slide in the direction Y significantly smaller than the length of the gap, but the dimension of the support slide in the direction X is also less than the width of the gap such that the support slide is displaceable in the gap both in the direction X and in the direction Y. Such a support slide for separative cutting may be displaced both in the direction X as well as in the direction Y and may be positioned below the workpiece part to be cut off so as to support the latter during the separating cut process. Such a support slide, by virtue of the smaller dimensions, forms only a small intrusive contour for moving the processing beam within the cutting gap. When cutting comparatively large workpiece parts, the support slide during machining may even be disposed completely within the contour to be cut, supporting the workpiece part in a part-region.

To increase good support of the workpiece part, the support slide in some advantageous embodiments on at least one lateral edge of the bearing face has a recess in which the processing beam is positioned when performing a separating cut, such that the workpiece part is supported on both sides of the recess.

In some further embodiments, the machine has an additional third movement unit (additional axis) for moving the machining head in the first direction (direction X) within the gap. The displacement range of the machining head in the direction X is restricted to the gap, i.e., the width of the gap is larger than the displacement range of the machining head in the direction X, or corresponds precisely to the latter, respectively. By virtue of the lower masses to be accelerated, the movement of the machining head along the additional axis in the direction X is more dynamic than the movement of the workpiece in the direction X, such that in particular small contours may be realized very much more rapidly using the axial movement of the additional axis, optionally in combination with the movement of the workpiece in the direction X.

The support slide may have a closed bearing face that does not have any opening for the passage of the processing beam, enabling good planar support of the workpiece. For example, the bearing face can be formed from a plurality of brushes as bearing elements. In this case, the bearing face when cutting a workpiece part off, e.g., at the moment when complete separation from the residual workpiece takes place, is disposed below the workpiece part, but beside the processing beam. A separating cut position along the cutting contour of the workpiece part to be cut off, at which separating cut position the workpiece part is completely separated from the (residual) workpiece, should be disposed on that side of the workpiece part that faces away from the support slide, so as to ensure adequate spacing of the processing beam from the support slide and nevertheless good support of the workpiece part during the separating cut process.

In some alternative embodiments, at least one opening for the passage of the processing beam is disposed in the bearing face of the slide. Likewise, two support slides that are displaceable in a coupled manner in the gap in the second direction (direction Y) may be provided, a gap that forms an opening for the passage of the laser beam being formed in the first direction (direction X) between the two support slides. In these cases, the support slide during cutting may be disposed below the workpiece part such that the latter is supported in a planar manner on either side of the processing beam, so as to reliably prevent tilting of the workpiece part. This embodiment also enables greater freedom in the choice of the separating cut position along the cutting contour of the workpiece part to be cut off.

When cutting small workpiece parts, such a support slide can be positioned below the machining head already before the workpiece has been pierced such that the processing beam after passing through the workpiece passes through the opening in the bearing face. Prior to the separating cut process, the processing beam may be moved to a position within the opening that has been predefined by a controller unit of the machine, the position guaranteeing support of the cut off workpiece part by the bearing face across the largest possible area.

In some variations of these embodiments, a plurality of openings of various sizes, i.e., of various area and/or geometry, are disposed in the bearing face of the support table, so as to support various workpiece parts in the best respective manner possible during the separating cut process. A large opening enables dynamic movement of the machining head in the directions X and Y within the opening, without a positioning movement of the support slide having to take place, and is therefore advantageous above all in the case of a machine that has an additional axis for dynamic movement of the machining head in the direction X within the gap. By contrast, it is favorable in the case of comparatively small workpiece parts for the latter to be disposed in the bearing face by way of as small an opening as possible at least during the separating cut process, i.e., at the moment of complete severing, such that the workpiece parts may be supported in as planar a manner as possible. Adapted support of the workpiece or of a workpiece part, respectively, at the point of time of separating cut completion leads to an increase in process reliability. The openings in the bearing face may be disposed so as to be mutually spaced apart, i.e., to be separate from one another.

It is also possible that at least two of the openings are interconnected. Such a connection may be established by a gap-shaped recess in the bearing face, for example, a recess that enables the processing beam to be moved to and fro in the recess. A recess of this type, or a connection between the openings of various sizes, respectively, which typically extends in the direction Y, enables displacement of the support slide in relation to the processing beam so as to "switch" between the openings without the processing beam needing to be switched off. In this manner, in the case of an activated processing beam, switching may be performed to and fro for example between a large and a small opening. A plurality of interconnected openings may form a contiguous recess having a plurality of regions of various diameters or of various sizes and/or geometries, respectively.

At least one of the openings is preferably connected to an external edge of the bearing face of the support slide. The connection may be established by a gap-type recess in the bearing face, for example. Alternatively, an opening along the external contour thereof may intersect the external edge of the bearing face so as to form the connection. If and when required, such a support slide having a bearing face that is laterally opened for the processing beam may be positioned below the processing beam without interruption of the cutting procedure, so as to support workpiece parts in an optimal manner during the separating cut process.

For example, in the case of workpiece parts of medium size being cut, the internal contours and a majority of the external contours of the workpiece part may be cut without employing the support slide. Prior to the separating cut, the processing beam is "threaded" through the laterally open opening or through the laterally open recess, respectively, such that the workpiece part during the separating cut process and post cut off may be supported by the support slide. "On the fly" introduction of the support slide into the cutting region is enabled by the laterally open support slide. For the "on the fly" introduction of the processing beam a movement in an additional axis of the machining head is not needed, i.e., the position of the machining head in the direction X remains constant during threading. The position of the laser beam for threading may be located in the center of the gap between the two workpiece-bearing faces, for example.

The support slide may preferably be displaced in the direction Y to a parking position outside the displacement range of the machining head, e.g. to a position on the external periphery or outside the gap. When large flexurally rigid workpiece parts are being cut, the support slide is displaced to the parking position, since support of workpiece parts of this type in the gap is not required.

In the case of some further embodiments, at least one part-region of the bearing face of the support slide and/or the support slide per se are/is displaceable in the direction of gravity (direction Z) and/or are/is downwardly pivotable. To avoid or establish contact between the support slide and the workpiece in a targeted manner, the support slide or the bearing face thereof in relation to the remaining part of the support slide may be embodied so as to be displaceable in the direction Z. While the support slide is displaced in the direction Y in the gap, the support slide or the bearing face thereof may be slightly lowered in this manner such that no scratching of the lower side of the workpiece by the bearing face or by the support slide, respectively, arises. The bearing face or the support slide is brought into direct contact with the lower side of the workpiece part by lifting so that the workpiece part to be separated can be supported at least immediately prior to being cut off.

Additionally, the support slide or the bearing face thereof may be embodied so as to be pivotable such that workpiece parts bearing on the bearing face after the separating cut may slide downward by way of a pivoting movement of the bearing face. Successive lowering and pivoting movements, or a combined lowering and pivoting movement, are/is also possible. In this manner, cut off workpiece parts, by way of a lowering movement of the bearing face, may initially be securely released from the remaining workpiece before the workpiece parts are removed from the machining area in a downward manner by the pivoting movement.

In certain further embodiments, the support slide is mechanically linked to at least one stationary discharge flap that is positioned so as to be adjacent to the gap and is guided so as to be displaceable such that pivoting of the support slide may be carried out conjointly with the discharge flap or flaps. In this case, discharging of the workpiece parts bearing on the bearing face may be performed by slowly lowering the discharge flap downward conjointly with the support slide, followed by a (rapid) tilting movement of the discharge flap conjointly with the support slide. It is ensured in this manner that workpiece parts may be removed in a process-reliable manner in a downward direction from the sheet skeleton or from the remaining workpiece, respectively. The conjoint movement of the support slide and the discharge flap, or linking the support slide to the discharge flap, respectively, may be performed by way of a linkage, for example.

In some further embodiments, the bearing face of the support slide forms the upper side of a suction box ("catcher") that is connected to a suctioning unit for suctioning slag and other residual process materials that arise when cutting.

In some further embodiments, a small-parts container and/or a parts chute are/is attached to the support slide, typically in a manner so as to be adjacent to the bearing face. The small-parts container, for example in the form of a basket, serves for collecting small workpiece parts formed during the separative machining. When small workpiece parts that do not bear on the bearing face of the support slide are being cut, the small-parts container or the small-parts chute may be moved under the workpiece part to be cut off just before the separating cut is performed. In this manner, sorting of small parts into scrap parts that freely fall through the gap and good parts that are discharged via the parts chute is possible.

By way of rapid movement of the support slide within the gap, relative movement of the support slide in relation to a workpiece part bearing on the bearing face may be generated, the bearing face under the workpiece part being withdrawn by the relative movement and the latter being conveyed from the bearing face into the gap or onto the parts chute that is disposed so as to be adjacent, or into the small-parts container.

In certain implementations, the machine tool additionally comprises a controller unit configured to determine the position of the support slide in the gap so as to depend on the size, the contour, and/or the thickness of a workpiece part to be cut off from the workpiece in the separative machining. The controller unit serves for displacing the support slide in the gap in the direction Y in a controlled manner and optionally and/or additionally in the direction X. Positioning of the support slide may be performed in a manner synchronous with the movement of the machining head in the direction Y and optionally in the direction X.

However, the movement of the support slide is typically independent of the movement of the machining head in the direction Y. In this manner, the support slide may be disposed so as to be spaced apart from the displacement path of the processing beam and, for example, be moved to a parking position outside the displacement range of the machining head, if the support slide is not required when cutting large workpiece parts, for example. If the support slide is required for supporting tilting-prone workpiece parts, the support slide may be disposed so as to be adjacent to the current machining position. In the case in which at least one opening is formed in the bearing face of the support slide, the support slide may be positioned to have the opening disposed at the machining position such that the processing beam passes through the opening.

In some embodiments, the controller unit is configured to determine the position of the support slide and/or of the opening of the bearing face in the first direction (direction X) so as to depend on the movement or position of the machining head in the first direction (direction X). In this case, determining the position of the support slide within the gap, or determining the position of the opening in the bearing face, respectively, is performed so as to depend on the movement in the additional axis of the machining head. For example, here the support slide that is movable in the direction X may be displaced in a manner synchronous with the movement in the additional axis of the machining head, so as to enable the separating cut of the workpiece part within a recess that is formed on the bearing face of the support slide. The opening in the bearing face may also be displaced or rotated during the separating cut process or immediately prior to the separating cut, so as to depend on the movement in the additional axis of the machining head, so as to guarantee support of the workpiece part that has as large an area as possible at the moment of separating cut.

A further aspect of the invention relates to a method for the separative machining of a workpiece in a machine as described above. The method includes selecting a position $(Y_U, X_U)$ of a support slide arranged to move freely within a gap between a first workpiece-bearing face of a first workpiece support unit and a second workpiece-bearing face of a second workpiece support unit of the machine, where the machine comprises a first movement unit configured to move the workpiece in a first direction (X), a second movement unit comprising a machining head configured to emit the processing beam and configured to move the machining head in a second direction (Y) perpendicular to the first direction (X) to align the processing beam onto the workpiece. The support slide is arranged to move freely within the gap in the second direction (Y) and includes a support slide bearing face for supporting workpiece parts that are cut in the course of the separative machining. The position $(Y_U, X_U)$ of the support slide is selected based on one or more of a size, a shape, and a thickness of a workpiece part to be cut off from the workpiece in the separative machining. The method also includes machining the workpiece via the processing beam.

In certain variants of the method, selecting the position $(Y_U, X_U)$ of the support slide comprises selecting one or more of a position $(X_U)$ of the support slide in the first direction (X) and selecting a position of an opening in a support slide bearing face in the first direction (X) and where selecting the position $(Y_U, X_U)$ of the support slide is performed in dependence of a position $(X_S)$ of the machining head in the first direction (X), so as to enable support of workpiece parts to be cut off that has as large an area as possible.

In some further variants, the support slide is disposed below a workpiece part to be cut off, typically below a tilting-prone workpiece part to be cut off. Workpiece parts that are smaller than the width of the gap and therefore during the separating cut process or after the separating cut process, respectively, bear on only one of the two workpiece bearings, as well as workpiece parts that are not flexurally rigid, are typically prone to tilting and during the separating cut process should be supported by the bearing face of the support slide.

In certain further variants, a separating cut position along a cutting contour of a workpiece part to be cut off, and the position of the support slide and/or of the opening in the bearing face of the support slide are chosen such that maximum planar support of the workpiece part to be cut off is performed by the bearing face, and/or that the positional stability of the workpiece part is guaranteed by the bearing face, during the separating cut process. The separating cut position is that position along the cutting contour at which the workpiece part is completely cut off from the (remaining) workpiece. To prevent tilting of the cut off workpiece part, the separating cut position should be selected such that in the case of a suitably positioned support slide and, optionally, in the case of suitable positioning of the opening, the bearing face or the bearing elements thereof, respectively, retain(s) the workpiece part in a stable position in relation to the cutting gas pressure acting thereon.

A plurality of possibilities of a discharging method exist in order for a cut off workpiece part to be discharged from the machine:

In some variants, discharging of the cut off workpiece part is performed by generating relative movement between the cut off workpiece part and the support slide, by accelerated movement of the support slide within the gap. In the case of this variant, the support slide is displaced so rapidly within the gap, or is accelerated so rapidly, respectively, that the bearing face under the workpiece part is withdrawn such that the latter loses the planar support by the bearing face and is removed from the machining region ideally by falling freely downward. The cut off workpiece part may be both a good part as well as a remnant part (reject part, waste) that has to be disposed of Good parts and remnant parts may be received by a parts chute below the workpiece-bearing faces or below the gap, respectively, the parts being separated from the slag that arises during machining and being mutually separated.

Alternatively or additionally to discharging by way of the gap, removal of the workpiece parts in an upward manner via suction grippers or magnetic grippers may be performed. As long as the workpiece-bearing faces are configured as conveyor belts, discharging may also be performed by movement of the belt-shaped workpiece-bearing faces in the first direction (direction X). As long as at least one of the two workpiece-bearing faces has one or a plurality of discharge flaps on one side of the gap, cut off workpiece parts may also be removed from the machining region by a downward pivoting movement of the flap(s).

Discharging a cut off workpiece part may also be performed by pivoting at least one part-region of the bearing face of the support slide, or by pivoting the support slide. As has been described above, for this purpose the bearing face may have one or a plurality of downwardly pivotable part-regions so as to enable discharging of small parts. In particular, when the support slide is mechanically coupled to a discharge flap by way of a linkage, for example, conjoint pivoting movement of the support slide and of the discharge flap may be performed in order for cut off workpiece parts to be discharged in a process-reliable manner. For discharging, the support slide may be downwardly pivoted even without a discharge flap having been provided so as to be adjacent to the gap. Prior lowering of the support slide may be performed prior to pivoting, so as to release the cut off workpiece part in a process-reliable manner from the remaining workpiece, i.e., without getting stuck.

Discharging the cut off workpiece part is preferably performed by lowering the support slide in the direction of gravity, e.g. by a linear movement, displacing the support slide in the second direction, and subsequently generating relative movement between the cut off workpiece part and the support slide. If the support slide is configured to be displaceable in the direction Z, the former may initially be lowered and displaced within the gap for discharging the workpiece part, so as to subsequently let the cut off workpiece part fall downward at a specific position in the direction Y by rapidly withdrawing the support slide.

The invention also relates to a computer program product comprising a non-transitory computer-readable storage device storing computer executable instructions for regulating separative machining of a workpiece in a machine that, if executed by a computer system, cause the computer system to carry out all of the steps of the methods described above. In particular, a data processing system may include a controller unit of the machine on which a machining program that is substantially composed of a sequence of control commands for coordinating the movements of the workpiece, of the machining head, of the support slide and, optionally, of the opening in the bearing face of the support slide is run.

Further advantages of the invention are derived from the description and the drawing. The aforementioned features and those to be listed hereunder likewise may be used individually or in arbitrary mutual combinations. The embodiments shown and described are not to be understood as a complete enumeration but are rather exemplary in terms of outlining the invention.

DESCRIPTION OF DRAWINGS

FIG. 6 shows an illustration of a support slide having a laterally attached parts chute.

FIG. 7 shows an illustration of a support slide having a laterally attached small-parts container and a suction box.

FIGS. 8A and 8B show illustrations of a support slide that is displaceable in a controlled manner in two directions in a gap when cutting off one large workpiece part as well as two small workpiece parts.

Identical reference signs are used for identical components and for components with identical functions, respectively, in the following description of the drawings.

DETAILED DESCRIPTION

Figure 1:
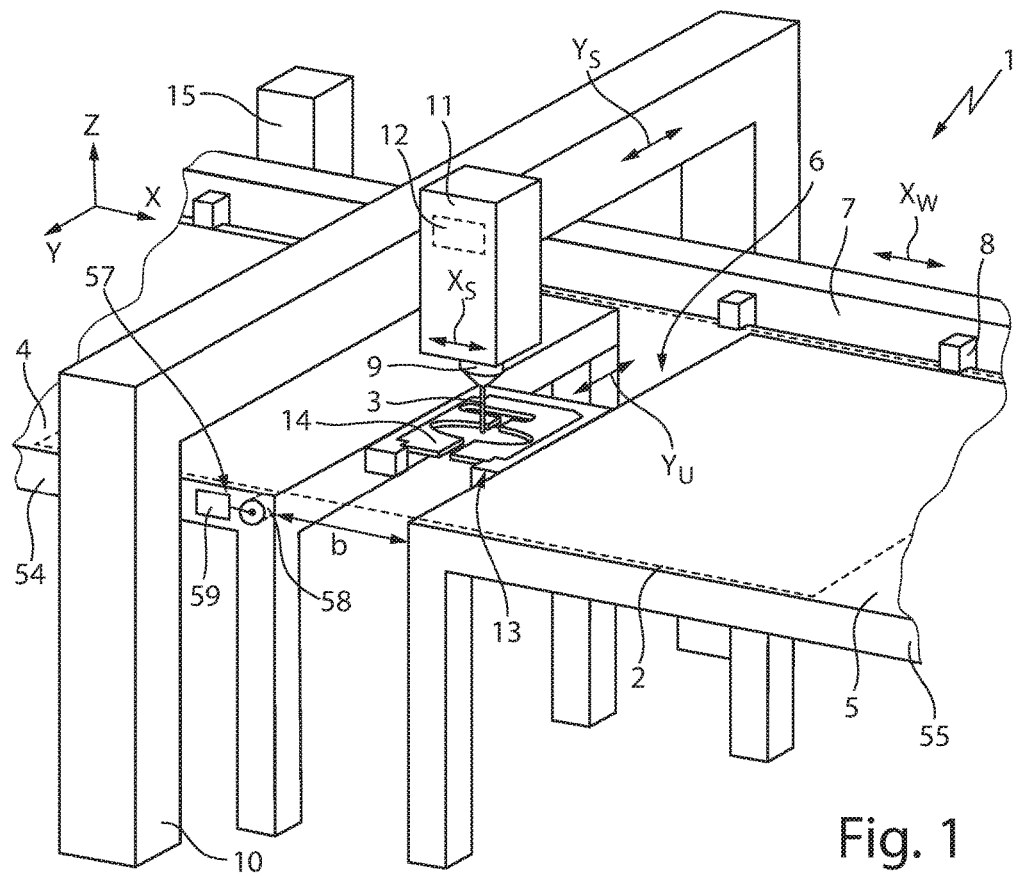
FIG. 1 shows an illustration of an exemplary embodiment of a laser processing machine for the separative machining of plate-shaped workpieces, having a displaceable support slide.

FIG. 1 shows an exemplary construction of a machine 1 for laser processing, more specifically for laser cutting, of a plate-shaped workpiece 2 by means of a laser beam 3. The plate-shaped workpiece 2 is depicted by dashed lines. Another type of processing beam, such as a plasma torch or a water jet, can be employed for machining or cutting the workpiece 2 instead of the laser beam 3. Two stationary work-piece bearing faces 4, 5 of workpiece support units 54, 55 support the workpiece 2 during machining. In certain embodiments, the workpiece-bearing faces 4, 5 are formed by brushes that are disposed on the upper side of the two workpiece support units 54 and 55. The brushes define a bearing plane (X-Y plane of an XYZ coordinate system) for bearing the workpiece 2 thereon, such as is disclosed in JP2001170727A, for example.

The workpiece 2 may be translationally moved in a controlled manner on the stationary workpiece-bearing faces 4, 5 in a first movement direction X (hereunder the direction X) and moved to a predefined workpiece position $X_W$ by means of a movement and retention unit 7 that has a drive and clamps 8 (chucking jaws) for fixedly holding the workpiece 2 and to displace the workpiece 2 with respect to the workpiece support units 54 and 55. The retention unit 7 can be coupled directly to the workpiece support units 54 and 55 or can be indirectly coupled to the workpiece support units 54 and 55 via a machine frame of the machine 1. Slide rollers (not shown) can be attached to the workpiece support units 54, 55 as an alternative to or in addition to the brushes to facilitate movement of the workpiece 2 on the bearing faces 4, 5 in the direction X. Moreover, for moving the workpiece 2 in the direction X it is possible, for example, for the workpiece-bearing faces 4, 5 per se to be designed as a movement unit, for example in the form of a (revolving) conveyor belt, such as is described in DE 10 2011 051 170 A1 of the applicant, or in the form of a workpiece bearing as is described in JP 06170469.

A gap 6 that extends in a second direction (hereunder the direction Y) across the entire displacement path of a laser cutting head 9 that aligns the laser beam 3 to the workpiece 2 and focusses the laser beam 3 on the workpiece 2, is formed between the two workpiece-bearing faces 4, 5. The laser cutting head 9 by means of a driven slide 11 that serves as a movement unit and that is guided on a stationary portal 10 is displaceable in a controlled manner in the direction Y within the gap 6. The stationary portal 10 can also be coupled directly to the workpiece support units 54 and 55 or can be indirectly coupled to the workpiece support units 54 and 55 via a machine frame of the machine 1 In the example shown, the laser cutting head 9 is additionally also displaceable in a controlled manner in the direction X within the gap 6 and may be displaced in a controlled manner with the aid of an additional movement unit 12 (additional axis), for example in the form of a linear drive, attached to the slide 11, in the direction X. The maximum displacement path of the laser cutting head 9 in the direction X corresponds to the width b of the gap 6.

With the aid of the movement unit 11, 12 that are based on each other, the laser cutting head 9 may be positioned both in the direction X as well as in the direction Y at a desired cutting head position $X_S$, $Y_S$ within the gap 6. Optionally, the laser cutting head 9 may also be translationally moved along a third movement direction Z (hereunder the direction Z), for example to adjust a suitable focal position for machining the plate-shaped workpiece 2.

A support slide 13 that extends across the entire width b of the gap 6, and is displaceable in a controlled manner in the gap 6 in the direction Y is disposed within the gap 6, which gap 6 delimits the machining region of the laser cutting head 9 in the direction X and the direction Y. The controlled movement of the support slide 13 in the gap 6 may be performed by means of a spindle drive 57, for example, the spindle nut being attached to the support slide 13, and the spindle 58 and the drive motor 59 of the spindle drive 57] being provided on one of the two stationary workpiece bearing faces 4, 5. The controlled movement of the support slide 13 in the gap 6 may also be implemented in other manners.

Figure 4A:
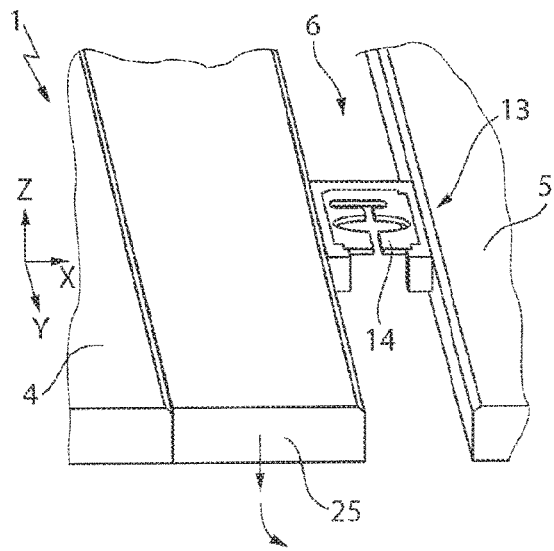
FIGS. 4A-4C show three illustrations of a support slide that is mechanically coupled to a discharge flap.
Figures 4B, 4C:
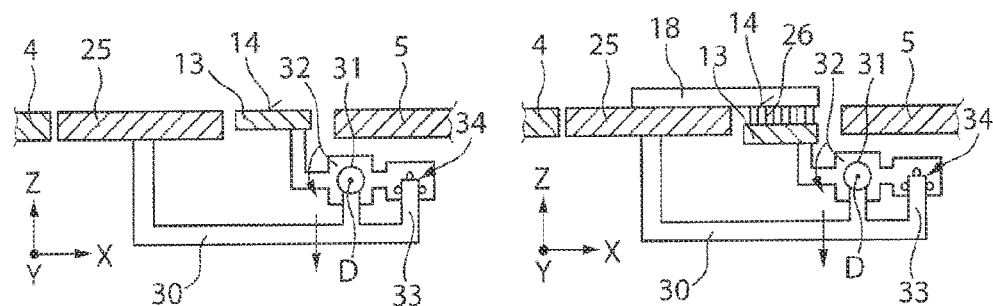

The support slide 13 can be moved in the direction Y to a desired position $Y_U$ in the gap 6 to support the workpiece 2, more specifically workpiece parts that are to be cut off from the workpiece 2 or are cut during machining, on a bearing face 14 of the support slide 13. The bearing face 14 can be disposed on or attached to the support slide 13. The bearing face 14 of the support slide 13, that may be formed by brushes 26 as bearing elements (as is shown in FIG. 4C), can be flush with the workpiece-bearing faces 4, 5 in the direction Z. Accordingly, the bearing face 14 can be located in the corresponding bearing plane as the workpiece 2.

The machine 1 has a controller unit 15 that coordinates movements of the workpiece 2 with respect to the laser cutting head 9 for controlling the machining and/or cutting performed by the laser cutting head 9. The controller unit 15 can also control the movement of the support slide 13. The controller unit can adjust a desired workpiece position $X_W$ and/or a desired cutting head position $X_B$, $Y_U$, as well as a desired position $Y_U$ of the support slide 13, in order for cutting of a workpiece part having a predefined cutting contour to be enabled and for the workpiece part to be supported if required.

The movement of the support slide 13 may be performed synchronously with the movement of the cutting head 9, i.e., the distance between the position $Y_U$ of the support slide 13 and of the cutting head position $Y_B$ in the direction Y is constant. The movement of the support slide 13 may also be performed so as to be independent of the movement of the cutting head 9, i.e., the spacing between the position $Y_U$ of the support slide 13 and of the cutting head position $Y_B$ in the direction Y is variable during machining.

Figure 2:
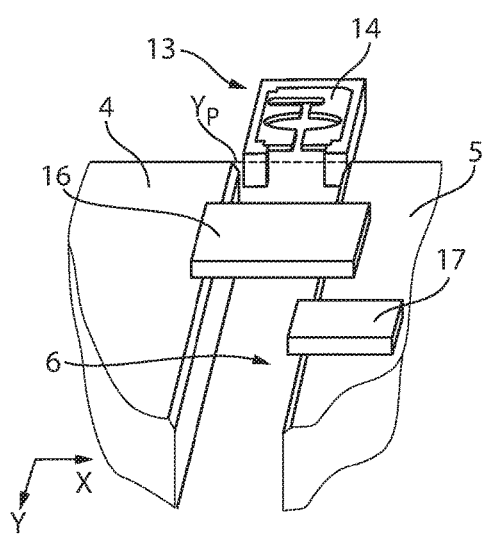
FIG. 2 shows an illustration of the support slide of FIG. 1, in a parking position.

The latter enables the distance of the position $Y_U$ of the support slide 13 from the cutting head position $Y_S$ to be selected in dependence on the size and/or the thickness of a workpiece part to be cut off from the workpiece 2. This is favorable since comparatively large workpiece parts that during the separating cut process of the (residual) workpiece 2 bear on both bearing faces 4, 5 bridge the gap 6 and, as long as the workpiece parts are of adequate thickness and thus flexural rigidity, typically do not have to be supported with the aid of the support slide 13. Such a workpiece part 16 that is not prone to tilting and that is flexurally rigid, and the width of which is larger than the width b of the gap 6, is illustrated in FIG. 2. Also in the case of a workpiece part 17 that is illustrated in FIG. 2 and is likewise comparatively thick and thus flexurally rigid, the dimensions of the workpiece part 17 being less than the width b of the gap 6 but the center of gravity of which being sufficiently far from the periphery of the gap 6, can be unsupported since the risk of tilting of part 17 into the gap 6 by virtue of the cutting gas that is generated by a processing nozzle of the laser cutting head 9 and that impacts the workpiece part 17 is low.

For machining the workpiece parts 16, 17 shown in FIG. 2, it is favorable for the support slide 13, which is not required for support, to be disposed at an adequate distance from the cutting head position $Y_S$ at which machining of the workpiece 2 takes place, so as to avoid contamination and/or damage to the support slide 13 by the laser beam 3. In this case in particular, the support slide 13 may be disposed in a parking position $Y_P$ shown in FIG. 2, which lies outside the gap 6 and thus outside the displacement range of the cutting head 9.

In the machining by cutting of tilting-prone workpiece parts that have an insufficient size or thickness, respectively, and thus insufficient flexural rigidity, the support slide 13 is typically disposed close to the cutting head position $Y_S$ below the workpiece part to be cut off so as to support the latter by way of the bearing face 14 across as large an area as possible or in a targeted manner at specific points. Such support is favorable in particular during the separating cut process of a workpiece part 18 (cf. FIG. 3) that is not flexurally rigid and/or is prone to tilting. Before being cut off, the workpiece part 18 is connected to the residual workpiece 2 as illustrated by the dashed lines in FIG. 3 only by way of a narrow web 19, and the workpiece part 18 is completely severed from the residual workpiece 2 by means of the laser beam 3. A force caused by the cutting gas exiting from the laser cutting head 9 is exerted on that part-region of the workpiece part 18 that is disposed within the gap 6 such that the workpiece part 18 after being cut off and without being supported will tilt under certain circumstances and will catch on the residual workpiece 2 in an undesirable manner.

Figure 3:
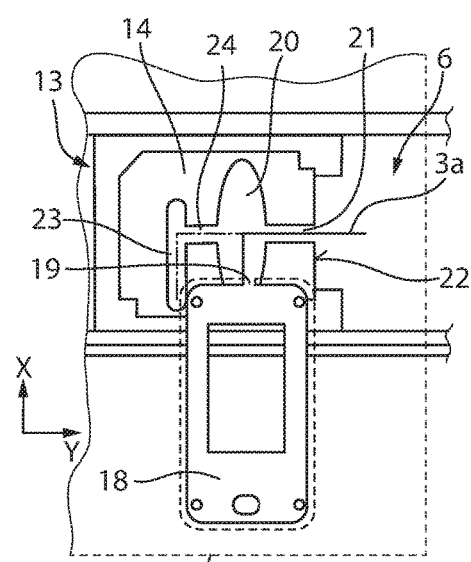
FIG. 3 shows an illustration of top view of the support slide of FIG. 1, when cutting off a workpiece part.

In order for as large of an area of support as possible for the workpiece part 18 to be cut off to be guaranteed at the moment when the separating cut is performed, the laser beam 3, the motion track 3a of which is shown in FIG. 3, by way of a gap-shaped recess 21 that is connected to an external edge 22 of the bearing face 14 that extends in the direction X, is threaded into an elliptic opening 20 in the bearing face 14. The laser beam 3 that is introduced into the elliptical opening 20 with the aid of the additional axis for the separating cut of the workpiece part 18 is positioned in the direction X such that separating cut may be performed along the web 19 without any movement of the support slide 13. The separating cut process is thus performed in that the laser beam 3 is displaced along the web 19 in the direction Y until the workpiece part 18 has been completely separated from the residual workpiece 2.

The comparatively large elliptical opening 20 here enables highly dynamic movement of the laser beam 3 or of the cutting head 9, respectively, both in the direction X as well as in the direction Y. The connection of the opening 20 to the external edge 22 of the bearing face 14 enables the "on the fly" introduction of the support slide 13 into the cutting region. It is thus not necessary for the laser beam 3 to be switched off for positioning the laser beam 3 within the opening. This is particularly advantageous in the case of machining the medium-sized workpiece part 18 shown in FIG. 3, because the internal contours thereof and a majority of the external contours can be cut without employing the support slide 13 before the latter is positioned in the region of the laser cutting head 9 for the separating cut process.

As opposed thereto, however, for workpiece parts that are significantly smaller than the workpiece part 18 shown in FIG. 3, achieving a separating cut on as small an opening as possible is favorable to ensure support by the bearing face 14 across as large an area as possible. In the case of the bearing face 14 shown in FIG. 3, a substantially rectangular further opening 23 that by way of a further gap-shaped recess or channel 24 that runs in the direction Y is connected to the elliptical opening 20 may be seen, so as to thread the laser beam 3 for the separating cut (illustrated with dashed lines in FIG. 3). The mutual connection between the openings 20, 23 enables the laser to switch between openings 20, 23 without having to switch off the laser beam 3.

In the case of workpiece parts 18 that do not completely bear on the bearing face 14, it may be favorable for the separating cut process to be performed as close as possible to one of the peripheries of the gap 6, i.e., as close as possible to that workpiece-bearing face 4, 5 on which the workpiece part 18 partially bears. Threading of the laser beam 3 is typically performed without movement in the additional axis, in the example shown in a position of the additional axis in which the laser beam 3 is positioned in the center of the gap 6. For the separating cut, the laser beam 3 by way of movement in the additional axis is moved in the direction of a periphery of the gap 6, as is indicated in FIG. 3. The separating cut process is typically also performed without any movement in the additional axis of the cutting head 9.

To establish contact between the bearing face 14 of the support slide 13 and the lower side of the workpiece 2 in a targeted manner, or to avoid such contact, the support slide 13 per se, or alternatively the bearing face 14 in relation to the remainder of the support slide 13, may be configured so as to be displaceable in a controlled manner in the direction Z. For example, the support slide 13 in the case of movement in the direction Y may be slightly lowered such that scratching of the lower side of the workpiece 2 by the bearing face 14 does not arise. Optionally, the bearing face 14 per se may be lowered in relation to a frame-type main body of the support slide 13 that can be seen in FIGS. 1 and 2. Upon the support slide 13 having been positioned at the desired position $Y_U$ for the separating cut, the bearing face 14 or the support slide 13, respectively, may be raised upward and brought into contact with the lower side of the workpiece 2 or of the workpiece part 18 to be cut off, respectively.

Additionally or alternatively to the possibility of lowering in the direction of gravity Z, the support slide 13 can also be mounted on the workpiece-bearing faces 4, 5 so as to be downwardly pivotable, so as to discharge cut off workpiece parts 18 through the gap 6 out of the laser processing machine 1. The pivoting movement of the support slide 13 is in particular favorable when at least one discharge flap 25 that extends in the direction Y is disposed between one of the workpiece-bearing faces 4 and the gap 6 that extends in the direction Y, as is illustrated in FIGS. 4A-4C, since a conjoint lowering and pivoting movement of the support frame 13 and the discharge flap 25 may be implemented in this case. As is indicated in FIG. 4a, in the case of such a movement, the discharge flap 25 can be initially lowered so as to avoid cut off workpiece parts catching on the residual workpiece. The comparatively slow lowering movement is followed by a more rapid tilting or pivoting movement, respectively, by means of which workpiece parts, which at least partially bear on the discharge flap 25, can be removed from the machining region in a downward manner through the gap 6.

If the support slide 13 is mechanically coupled to the discharge flap 25, conjoint lowering and pivoting of the support slide 13 and of the discharge flap 25 may be performed. One example of the implementation of such a mechanical coupling is illustrated in FIG. 4B. In general, a guide as well as a drive are required for the controlled movement of the support slide 13 in the direction Y. In the case of the example shown in FIG. 4B, the drive of the support slide 13 is formed by a ball screw assembly 31, the spindle and the drive motor of which are attached to a linkage 30 of the discharge flap 25. The threaded nut 32 is attached to the support slide 13, comprising at least one guide element 34 that is displaceably guided in a part-region 33 of the linkage 30 configured as a linear guide.

The conjoint lowering movement of the support slide 13 and of the discharge flap 25 can be achieved by lowering the linkage 30. The pivoting movement may be implemented by way of rotation about a rotation axis D that substantially coincides with the position of the axis of the ball screw assembly 31. By way of the conjoint pivoting movement, workpiece parts that bear both on the discharge flap 25 as well as on the bearing face 14 of the support slide 13, may be discharged in a process-reliable manner through the gap 6. It is self-evident that a combined pivoting and lowering movement of the support slide 13 may also be implemented without any mechanical linking to a discharge flap.

FIG. 4B shows an exemplary embodiment in which the bearing face 14 of the support slide 13 is formed by the planar upper side of the support slide 13, while FIG. 4C illustrates an exemplary embodiment in which the bearing face 14 of the support slide 13 is formed on the upper side of a plurality of bearing elements 26 in the form of brushes. Also in the case of the example shown in FIG. 4C, the bearing face 14 formed by the upper sides of the brushes 26 is flush with the workpiece-bearing faces 4, 5 (that likewise may have brushes as bearing elements), such that a workpiece part 18 bearing on the discharge flap 25 and on the support slide 13 is supported in a planar manner.

Figure 5:
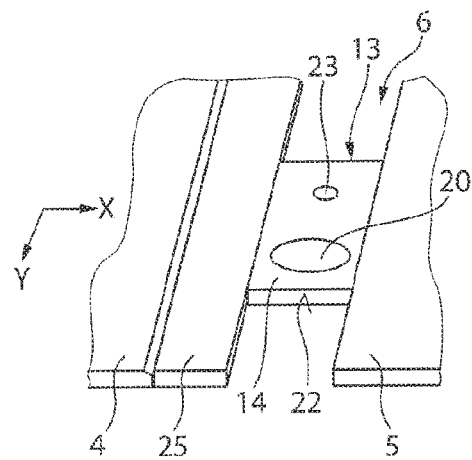
FIG. 5 shows an illustration of a support slide having a bearing face having two separate openings.

FIG. 5 shows a detail of a machine 1 in which the discharge flap 25 likewise may be lowered and downwardly pivoted in a manner conjoint with the support slide 13. The bearing face 14 of the support slide 13 shown in FIG. 5 has two circular openings 20, 23 that are not interconnected. There is also no connection between any of the openings 20, 23 and any of the lateral external edges 22 of the support slide 13. In the case of a bearing face 14 designed in such a manner, it is favorable in terms of supporting small workpiece parts for the support slide 13 to be positioned in the gap 6 already when the workpiece 2 is pierced such that the laser beam 3 passes through one of the openings 20, 23, so that machining by cutting and the separating cut process of the workpiece part can be performed by moving the laser beam 3 within the selected opening 20, 23 without the laser beam 3 having to be switched off.

In the case of the support slide 13 shown in FIG. 6, a parts chute 40 for discharging small workpiece parts is shown, the parts chute 40 being attached to the support slide 13 so as to be adjacent to the bearing face 14. Workpiece parts that are capable of being discharged via the chute 40 have dimensions that are smaller than the width b of the gap 6 (as shown in FIG. 1). For such cut off workpiece parts to be conveyed to the chute 40, the support slide 13 may be dynamically displaced, e.g. at high acceleration, in the direction Y such that relative movement between the cut off workpiece part and the support slide 13 is performed, the workpiece part being translationally moved to the side, i.e. in the direction Y, and ideally freely falling onto the chute 40.

The chute 40 can also be positioned below a workpiece part to be cut off just prior to the separating cut, wherein the workpiece part is not supported by the bearing face of the support slide 13. In this manner, separation of waste parts that freely fall through the gap 6 and good parts that are discharged via the parts chute 40 is possible. The chute 40 is disposed so far below the bearing face 14 that lateral discharging of workpiece parts in the direction X may be performed without any collision with the workpiece-bearing faces 4, 5.

Discharging of workpiece parts by dynamic movement of the support slide 13 can also be performed without using a chute 40 that is attached to the support slide 13 in that the workpiece part bearing on the bearing face 14 is translationally moved in a lateral manner and ideally is discharged downward in a free-falling manner through the gap 6.

A further possibility for discharging small workpiece parts consists in laterally attaching a small-parts container 42 to the support slide 13, as is shown in an exemplary manner in FIG. 7. As opposed to the parts chute 40 shown in FIG. 6, the small-parts container 42 serves for receiving and storing small workpiece parts. The parts stored in the small-parts container 42 may be removed in the parking position $Y_P$ (cf. FIG. 2) of the support slide 13, for example. A suction box 41 that is attached to the support slide 13, the upper side of the former forming the bearing face 14, is likewise shown in FIG. 7. The suction box 41 serves for suctioning residual process materials, for example slag arising during cutting and other residual process materials that are directed via a pipe connection 56 indicated in FIG. 7 to a suction unit (not shown). A support slide 13 configured in this manner is usually displaced in the direction Y in a manner synchronous with the movement of the laser beam 3 or of the cutting head 9, respectively.

Apart from the possibilities for discharging workpiece parts that have been described above, it is likewise possible for cut off workpiece parts to be discharged in an upward manner, for example by using suction grippers or magnetic grippers (not shown). Should the workpiece-bearing faces 4, 5, in a manner different to the one shown in FIG. 1, be configured in the manner of a conveyor belt, cut off workpiece parts may also be discharged by movement of the conveyor belt in the direction X.

FIGS. 8A and 8B show a support slide 13 the dimensions of which in the direction X are smaller than the width b of the gap 6, such that the support slide 13 is displaceable within the gap 6 in a controlled manner both in the direction X as well as in the direction Y. The support slide 13, both in the direction X as well as in the direction Y, is positioned at a suitable position $Y_U$, $X_U$ within the gap 6 so as to support a workpiece part 18 across as large an area as possible during the separating cut process. As is shown in FIG. 8a, a comparatively large workpiece part 18 here may be supported both by the support slide 13 as well as by one of the workpiece bearings or, as is the case in the example shown, by a discharge flap 25. For the separating cut, the laser beam 3 is favorably disposed in a recess 21 of the bearing face 14 of the support slide 13, so as to cut off the workpiece part 18 from the residual workpiece at a separating cut position FP, which, in the case of the example shown, is formed at a corner of the square cutting contour of the workpiece part 18. The cut off workpiece part 18 shown in FIG. 8A may be removed from the machining region by pivoting the discharge flap 25, optionally in a conjoint manner with the support slide 13. Additionally or alternatively, the support slide 13 may be dynamically displaced in the direction X and optionally in the direction Y, so as to effect discharging by generating relative movement between the support slide 13 and the workpiece part 18.

FIG. 8B shows a support slide 13 on which one recess 21a, 21b is applied to each of two sides, which in the direction Y are mutually opposite, so as to guarantee greater flexibility in the case of workpiece parts 18a, 18b being cut off and discharged. Two workpiece parts 18a, 18b of identical size are illustrated in FIG. 8B, which during the separating cut at a respective separating cut position FP each bear almost completely on the bearing face 14, thus being supported across a large area. Also in the case of the example shown in FIG. 8B, discharging of the workpiece parts 18a, 18b may be implemented by dynamic movement of the support slide 13 in the direction X and/or in the direction Y, so as to effect discharging by way of a translational movement in a lateral manner of the workpiece parts 18a, 18b in relation to the bearing face 14.

In summary, support of workpiece parts that is adapted to the size and/or thickness of workpiece parts to be cut off can be performed in the manner described above during machining by cutting, in particular in the case of the separating cut. Simplified discharging of cut off workpiece parts can also be implemented with the aid of the support slide.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A machine for the separative machining of a plate-shaped workpiece by a processing beam, the machine comprising:
    a first movement unit configured to move the plate-shaped workpiece in a first direction (X);
    a second movement unit comprising a machining head configured to emit the processing beam, wherein the second movement unit is configured to move the machining head in a second direction (Y) perpendicular to the first direction (X) to direct the processing beam onto the workpiece;
    a first workpiece support unit including a first workpiece-bearing face for supporting the workpiece;
    a second workpiece support unit including a second workpiece-bearing face for supporting the workpiece, wherein the first workpiece support unit and the first workpiece bearing face are spaced apart by a gap from the second workpiece support unit and the second workpiece-bearing face, wherein the gap extends along the second direction (Y);

at least one support slide arranged to move freely in the second direction (Y) within the gap, wherein the at least one support slide comprises a support slide bearing face for supporting workpiece parts that are cut in the course of the separative machining, and wherein the at least one support slide can move freely within a displacement range of the processing beam along the gap and includes at least one opening in the support slide bearing face that extends through the support slide to enable passage of the processing beam through the support slide, wherein the at least one opening extends through an external edge of the support slide so that the processing beam can be positioned within the opening without having to be switched off; and a drive unit configured to displace the at least one support slide in a controlled manner within the gap independent of movement of the machining head.

2. The machine of claim 1, wherein the drive unit is configured to displace the at least one support slide in a controlled manner in the first direction (X) within the gap.

3. The machine of claim 1, wherein the machine comprises a third movement unit for moving the machining head in the first direction (X) within the gap.

4. The machine of claim 1, wherein the at least one opening comprises a plurality of openings of at least one of various sizes and various geometries.

5. The machine of claim 4, wherein at least two of the openings are interconnected by a channel.

6. The machine of claim 4, wherein at least two of the plurality of openings extend through the external edge of the at least one support slide.

7. The machine of claim 1, wherein the at least one support slide is displaceable in the second direction (Y) to a parking position ($Y_P$) outside of a displacement range of the machining head.

8. The machine of claim 1, wherein one or more of at least one part-region of the bearing face of the at least one support slide and the at least one support slide itself is at least one of displaceable in the direction of gravity (Z) and downwardly pivotable.

9. The machine of claim 1, further comprising a discharge flap arranged adjacent to the gap wherein the at least one support slide is displaceable along the discharge flap and is arranged to pivot downwards conjointly with the discharge flap.

10. The machine of claim 1, wherein the bearing face of the at least one support slide forms the upper side of a suction box for suctioning residual process materials.

11. The machine of claim 1, further comprising at least one of a small-parts container and a parts chute attached to the at least one support slide.

12. The machine of claim 1, further comprising a controller unit configured to determine the position (YU, XU) of the at least one support slide in the gap so as to depend on one or more of a size, a shape, and a thickness of a workpiece part to be cut off from the workpiece in the separative machining.

13. The machine of claim 12, wherein the controller unit is configured to determine at least one of the position ($X_U$) of the at least one support slide and of the opening of the bearing face in the first direction (X) so as to depend on the position ($X_S$) of the machining head in the first direction (X).

* * * * *